(12) United States Patent
Matsui

(10) Patent No.: US 8,745,428 B2
(45) Date of Patent: Jun. 3, 2014

(54) METHOD FOR CLOCK GATING A DSP WHEN NOT IN USE

(75) Inventor: Nobuaki Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1013 days.

(21) Appl. No.: 12/824,035

(22) Filed: Jun. 25, 2010

(65) Prior Publication Data

US 2010/0332797 A1 Dec. 30, 2010

(30) Foreign Application Priority Data

Jun. 30, 2009 (JP) .................................. 2009-155315

(51) Int. Cl.
*G06F 1/00* (2006.01)

(52) U.S. Cl.
USPC .......................................... 713/322; 713/324

(58) Field of Classification Search
None
See application file for complete search history.

(56) References Cited

U.S. PATENT DOCUMENTS

| | | | |
|---|---|---|---|
| 6,519,706 B1 * | 2/2003 | Ogoro ............................. | 713/322 |
| 6,839,828 B2 * | 1/2005 | Gschwind et al. ............... | 712/20 |
| 7,149,888 B1 * | 12/2006 | Hart et al. .......................... | 713/2 |
| 2002/0056030 A1 * | 5/2002 | Kelly et al. .................... | 711/150 |
| 2002/0166075 A1 * | 11/2002 | Agarwal et al. ................ | 713/320 |
| 2003/0097585 A1 * | 5/2003 | Girard ............................ | 713/200 |
| 2005/0204181 A1 * | 9/2005 | Montero et al. ................... | 714/4 |
| 2006/0018372 A1 * | 1/2006 | Chen et al. ..................... | 375/219 |
| 2007/0130446 A1 * | 6/2007 | Minakami ........................ | 712/34 |
| 2007/0130609 A1 * | 6/2007 | Han et al. ....................... | 725/132 |

FOREIGN PATENT DOCUMENTS

| | | |
|---|---|---|
| CN | 1664744 A | 9/2005 |
| JP | 5-235710 A | 9/1993 |
| JP | 2004-086555 A | 3/2004 |
| JP | 2004-310549 A | 11/2004 |
| KR | 10-2006-0041632 A | 5/2006 |

* cited by examiner

*Primary Examiner* — Jacob A Petranek

(74) *Attorney, Agent, or Firm* — Canon USA, Inc. IP Division

(57) ABSTRACT

An information processing apparatus includes a first processing unit, a second processing unit which is different from the first processing unit, a supply unit configured to supply a clock to the first processing unit and the second processing unit, and a control unit configured to control the supply unit in such a manner as to stop a supply of the clock to the second processing unit in response to completion of activation of the second processing unit, and to resume the supply of the clock to the second processing unit in response to completion of activation of the first processing unit.

21 Claims, 5 Drawing Sheets

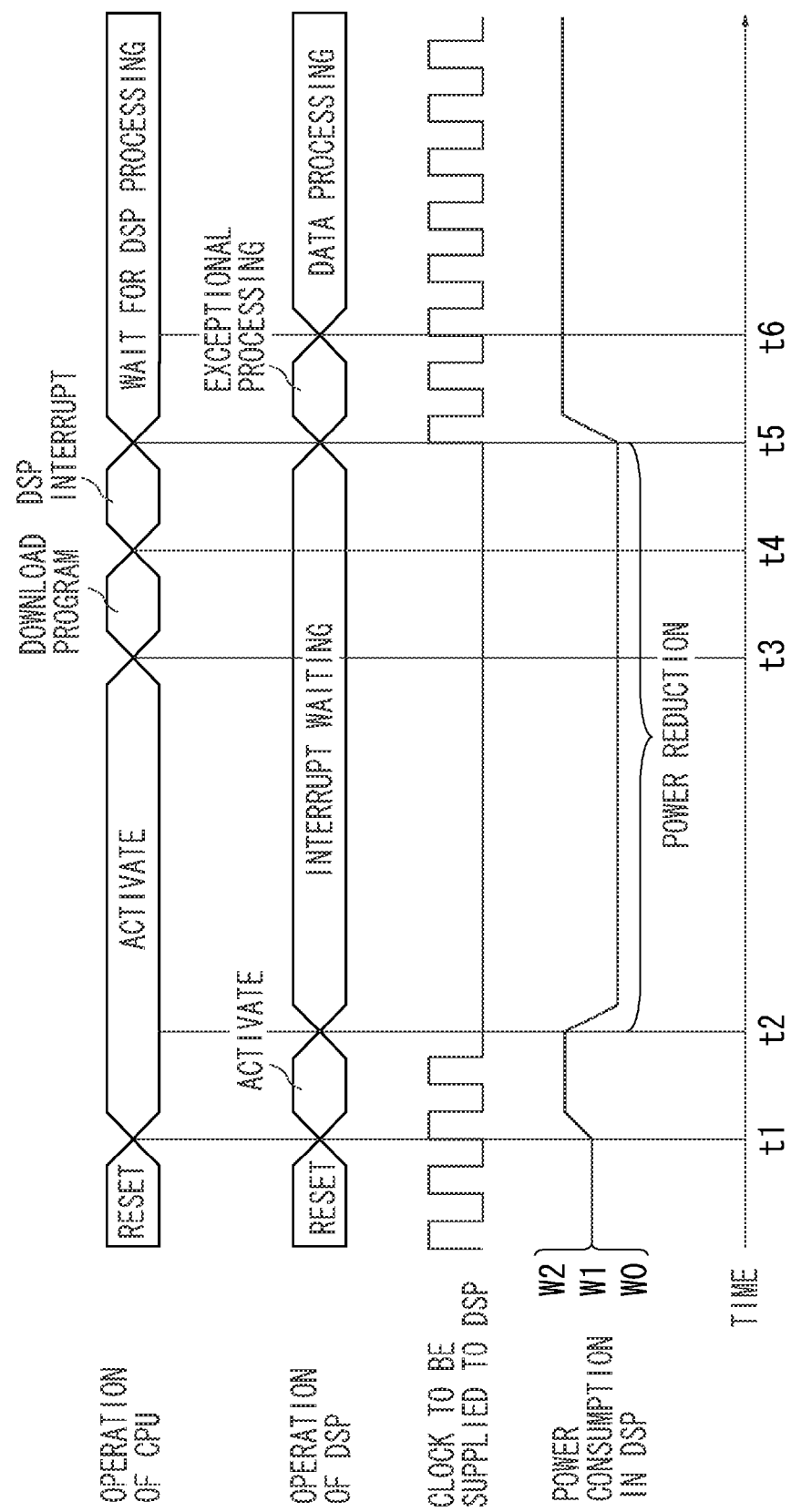

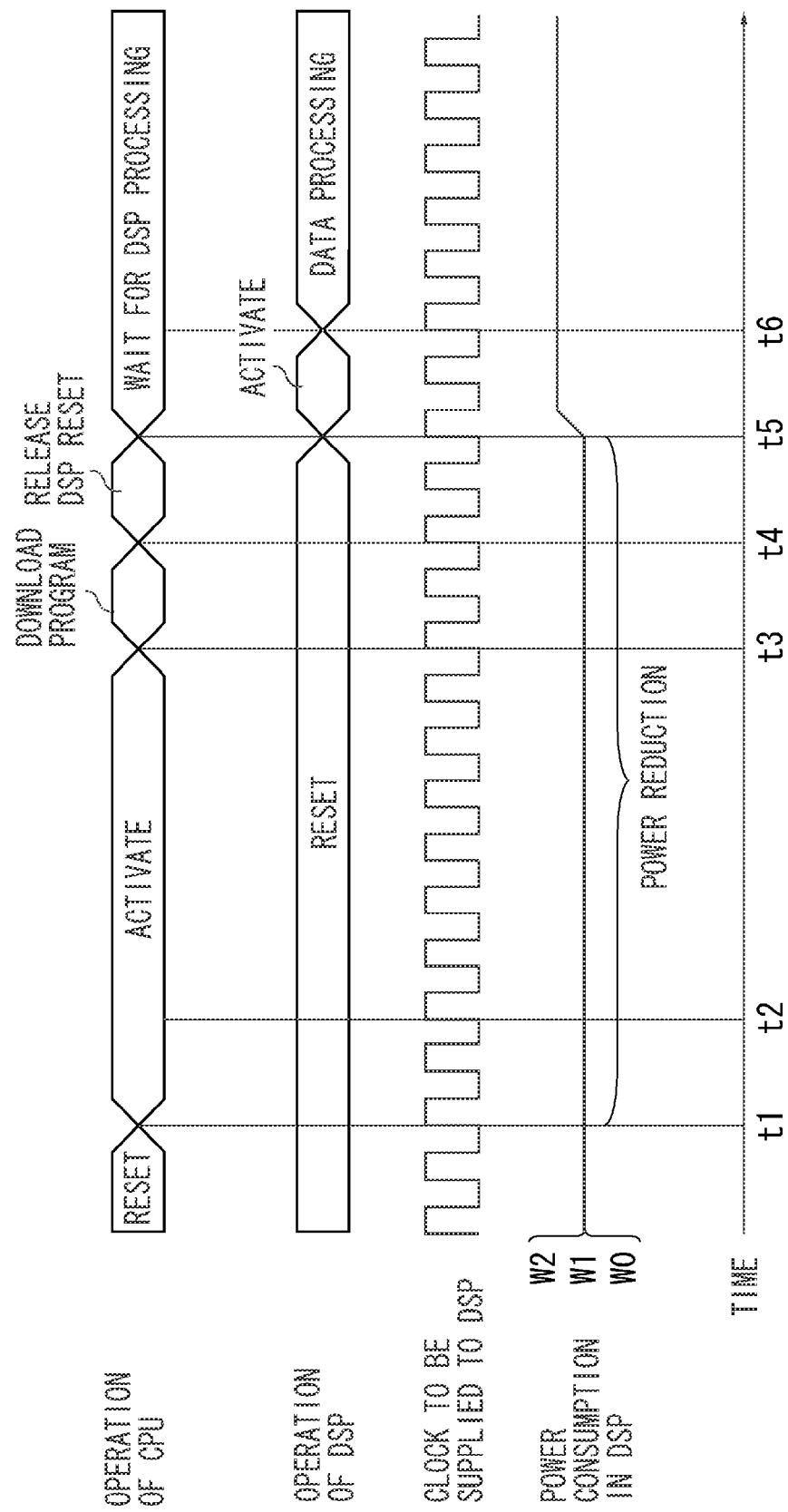

METHOD FOR CLOCK GATING A DSP WHEN NOT IN USE

BACKGROUND OF THE INVENTION

1. Field of the Invention

The present invention relates to an information processing apparatus, a control method for the information processing apparatus, and a program.

2. Description of the Related Art

Recently, an information processing apparatus configured with a asymmetrical multiprocessor system which combines a central processing unit (CPU) (general-use processor) and a digital signal processor (DSP) (processor specialized in data processing) has been increased.

In the asymmetrical multiprocessor system, in many cases, the CPU and the DSP take a master-slave configuration. In the master-slave configuration, the CPU serves as a master processor and the DSP serves as a slave processor. The CPU and the DSP share a memory, and the CPU controls activation and operation of the DSP.

Conventionally, in the information processing apparatus configured with the master-slave asymmetrical multiprocessor system, processing as illustrated in FIG. 5 has been executed when the system is activated. First, the CPU executes activation processing of the CPU (time t1 to t3). Next, the CPU downloads software of the DSP (time t3 to t4). Next, the CPU releases reset of the DSP (time t4 to t5). Then, the DSP executes activation processing of the DSP (time t5 to t6).

As a technique for reducing electric power consumption of hardware, there is a technique referred to as a clock gating. The clock gating is a technique for stopping supply of clock to the hardware, when the hardware is not operating (See Japanese Patent Application Laid-Open No. 5-235710).

In general, when the hardware is reset, supplying the clock to the hardware is to be continued. Therefore, in the information processing apparatus of the above described configuration, electric power consumption cannot be reduced by applying the clock gating, if the DSP is not executing any processing while the CPU executes activation processing or the like.

SUMMARY OF THE INVENTION

According to an aspect of the present invention, an apparatus includes a first processing unit, a second processing unit, a supply unit configured to supply a clock to the first and second processing units, and a control unit configured to control the supply unit in such a manner as to stop a supply of the clock to the second processing unit in response to completion of activation of the second processing unit, and to resume the supply of the clock to the second processing unit in response to completion of activation of the first processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a time chart illustrating a sequence of processing that the CPU and the DSP execute when the MFP is activated.

FIG. 5 is a time chart illustrating a conventional technique.

DESCRIPTION OF THE EMBODIMENTS

Various exemplary embodiments, features, and aspects of the invention will be described in detail below with reference to the drawings.

Figure 1:
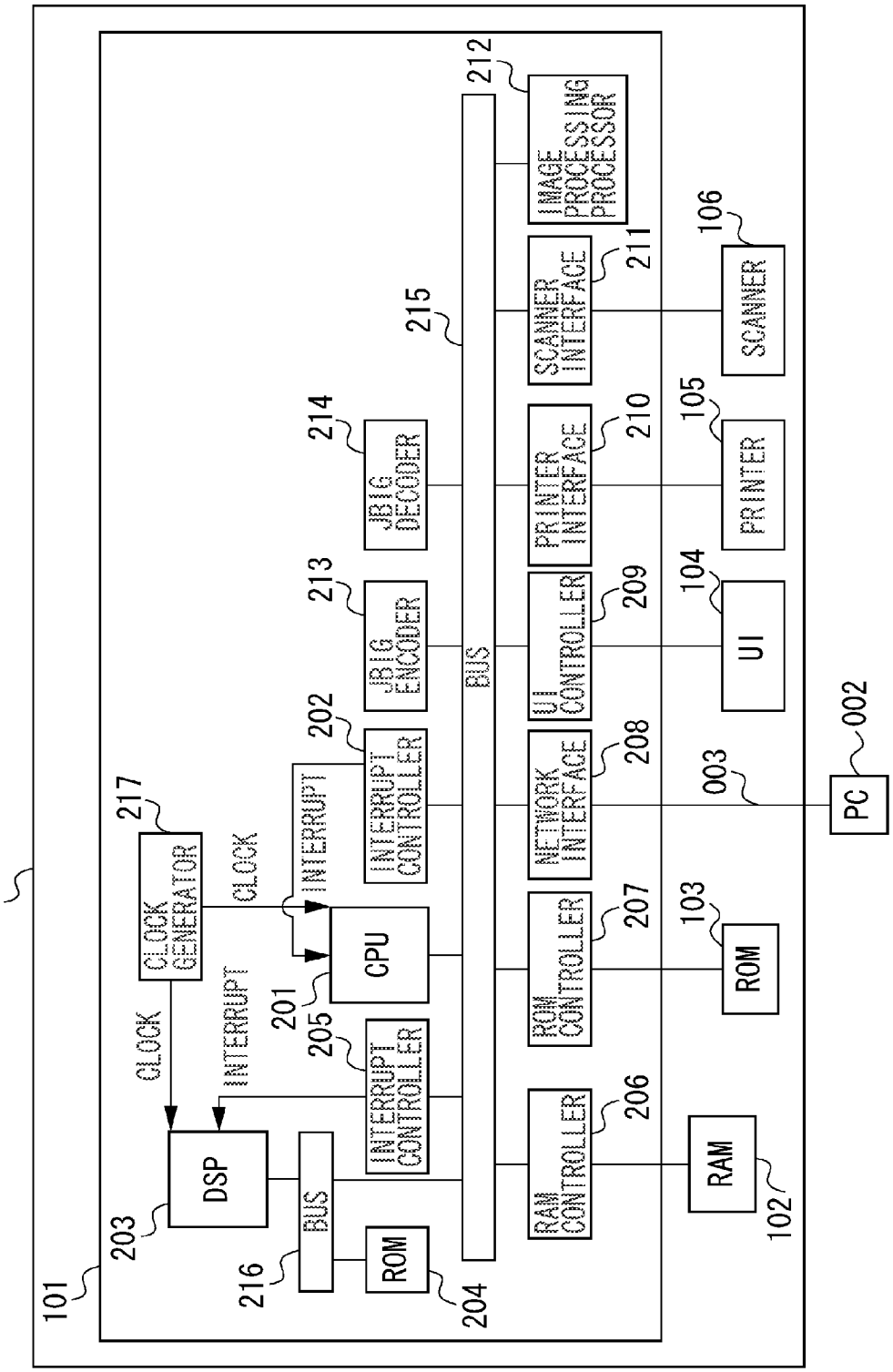
FIG. 1 is a block diagram illustrating a configuration of a system of an exemplary embodiment of the present invention.

FIG. 1 is a block diagram illustrating a configuration of a system according to a first exemplary embodiment.

In FIG. 1, the system includes an MFP 001, a personal compute (PC) 002, and a network 003. The MFP 001 can communicate with the PC 002 via the network 003.

The MFP 001 includes a system large scale integration (LSI) 101, a random-access memory (RAM) 102 (volatile storage medium), a read-only memory (ROM) 103 (non-volatile storage medium). The ROM 103 stores a boot program of a CPU 201, a control program of the CPU 201, a data processing program of a DSP 203 and the like. The MFP 001 further includes an operation unit 104, a printer 105, and a scanner 106.

When a print command is received from the PC 002, the MFP 001 executes image processing on image data by the system LSI 101, and causes the printer 105 to print an image on a sheet. Further, upon reception of a copy command from a user using the operation unit 104, the MFP 001 reads an original document by the scanner 106, and executes image processing on image data by the system LSI 101, and causes the printer 105 to print an image on a sheet.

The system LSI 101 includes the CPU 201 through a bus 216. The CPU 201 controls the MFP 001. The CPU 201 expands a program which is stored in the ROM 103 in the RAM 102 and executes it. An interrupt controller 202 notifies the CPU 201 of an interruption from the network 003 or the like. The DSP 203 executes rendering processing, scanner image processing and so forth for assisting processing by the CPU 201. The CPU 201 and the DSP 203 are in a relationship that the CPU 201 is a master and the DSP 203 is a slave.

A ROM 204 (non-volatile storage medium) stores a boot program and the like of the DSP 203. The ROM 204 also stores an address on the RAM 102 that stores the data processing program of the DSP 203. An interrupt controller 205 notifies the DSP 203 of an interruption from the network 003 or the like. A RAM controller 206 executes reading and writing of data from and to the RAM 102 in response to a memory access request from the CPU 201 or the like. A ROM controller 207 executes reading of data from the ROM 103 in response to a ROM access request from the CPU 201 or the like.

A network interface 208 executes transmission and reception of data to and from the network 003 in response to a network access request from the CPU 201 and the like. A user interface (UI) controller 209 transfers data for displaying in the operation unit 104 from the CPU 201 to the operation unit 104, and transfers data which is input by the user in the operation unit 104 from the operation unit 104 to the CPU 201. A printer interface 210 transfers image data stored in the RAM 102 to the printer 105. A scanner interface 211 transfers image data read by the scanner 106 to the RAM 102.

An image processor 212 executes image processing for printing an image stored in the RAM 102. A Joint Bi-level Image Experts Group (JBIG) encoder 213 executes JBIG compression on image data before the JBIG compression stored in the RAM 102. A JBIG decoder 214 executes JBIG decompression on the image data after the JBIG compression stored in the RAM 102. A bus 215 mediates communications of data between each of components in the system LSI 101. A bus 216 mediates communications of data between the DSP 203 and the ROM 204 or the bus 215.

A clock generator 217 generates a clock for the CPU 201 and the DSP 203 to operate, and supplies the generated clock to the CPU 201 and the DSP 203. The clock generator 217 can supply the generated clock, as the need arises, to components other than the CPU 201 and the DSP 203.

Figure 2:
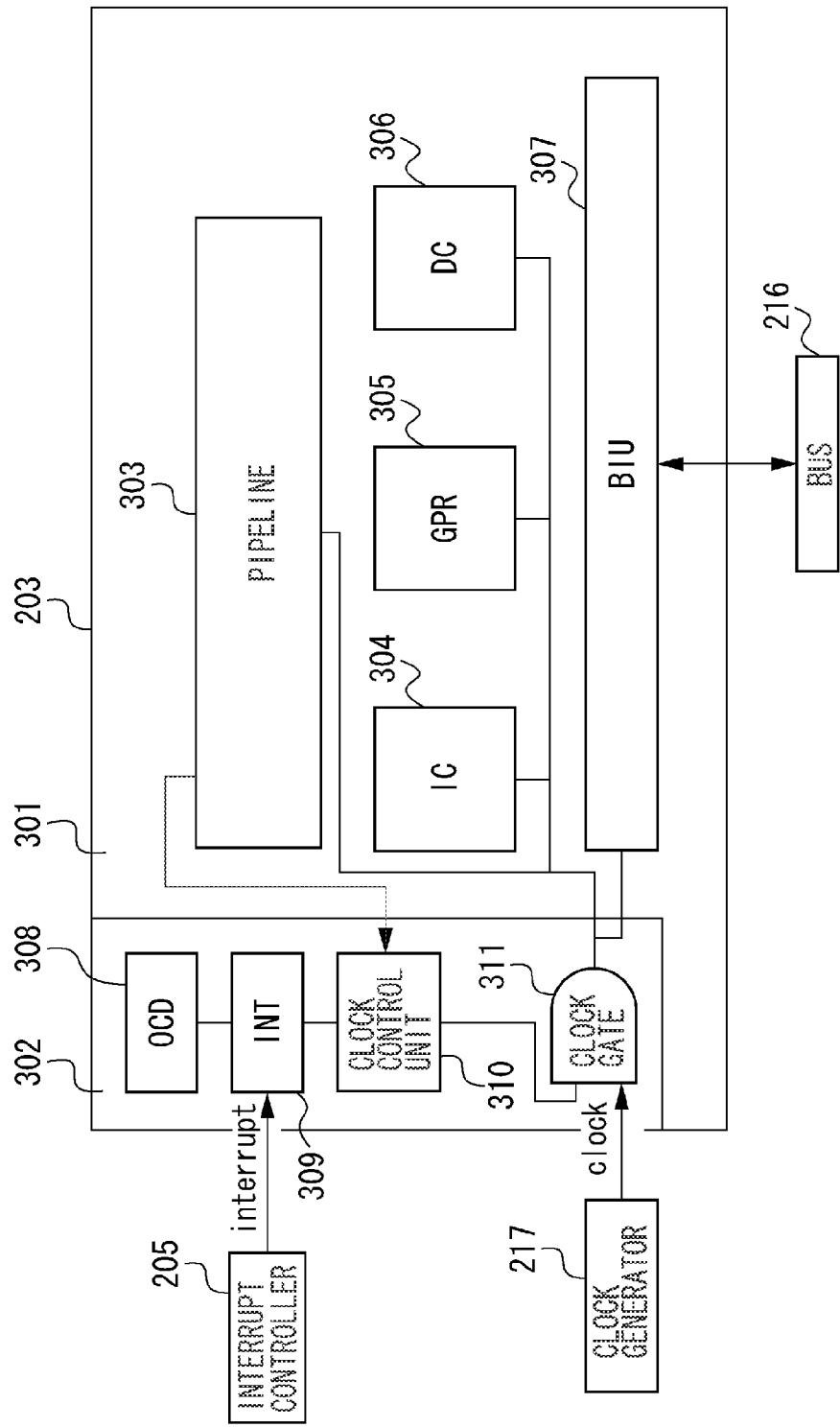
FIG. 2 is a block diagram illustrating a configuration of a DSP.

FIG. 2 is a block diagram illustrating a configuration of the DSP 203 according to the present exemplary embodiment.

The DSP 203 can be divided into a main domain 301 and a sub-domain 302. The main domain 301 includes a pipeline 303, a instruction cache (IC) 304, a general purpose register (GPR) 305, a data cache 306, and a bus interface unit (BIU) 307. The sub-domain includes an on-chip debug unit (OCD) 308, an interrupt processing unit (INT) 309, a clock control unit 310, and a clock gate circuit 311.

As states of the DSP 203, an operating state, a reset state, and an interrupt waiting state exist. When the DSP 203 is in the operating state, the clocks are supplied to the main domain 301 and the sub-domain 302, and electric power is consumed. When the DSP 203 is in the reset state, the clocks are supplied to the main domain 301 and the sub-domain 302, and a lower electric power than that in the operating state is consumed. When the DSP 203 is in the interrupt waiting state, the clock is not supplied to the main domain 301, and the clock is supplied only to the sub-domain 302, so a lower electric power than that in the reset state is consumed. Instruction of switching state of DSP 203 to interrupt waiting state is executed in PIPELINE 303. Information for stopping clock is transmitted from PIPELINE 303 to CLOCK CONTROL UNIT 310, and clock is stopped.

Figure 3:
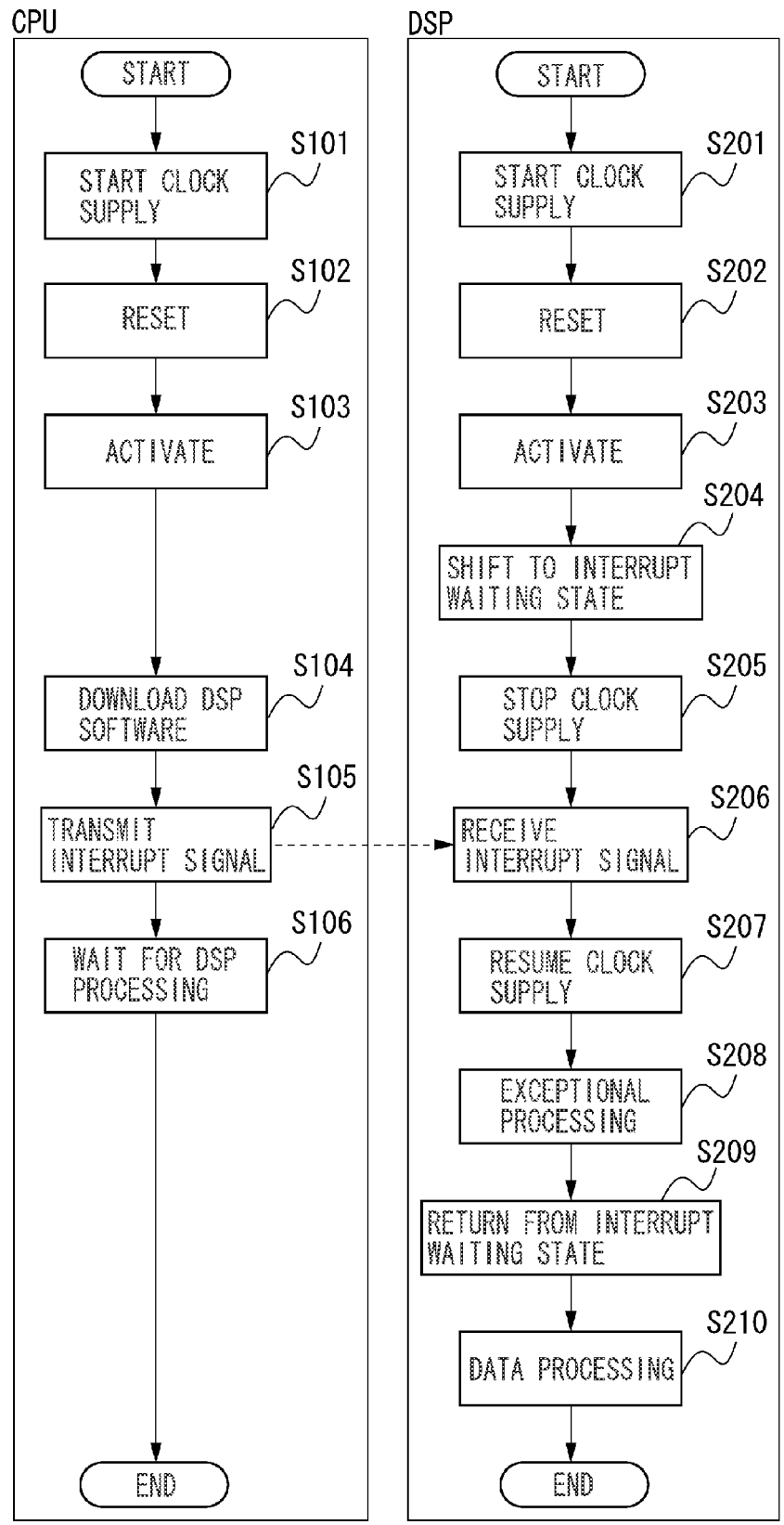
FIG. 3 is a flowchart illustrating a sequence of processing that the CPU and the DSP execute when a multifunction peripheral (MFP) is activated.

FIG. 3 is a flowchart illustrating a sequence of processing of the CPU 201 and the DSP 203 to be executed when the MFP 001 is activated.

The sequence illustrated in the flowchart is executed when the MFP 001 is turned on the electric power supply or is returned from a power saving mode to a normal mode.

First, in step S101, the clock generator 217 starts supplying the clock to the CPU 201. Concurrently, in step S201, the clock generator 217 starts supplying the clock to the DSP 203.

Next, in step S102, the CPU 201 resets the CPU 201. Concurrently, in step S202, the DSP 203 resets the DSP 203.

Next, in step S103, the CPU 201 executes activation processing of the CPU 201 using the boot program of the CPU 201 stored in the ROM 103. Concurrently, in step S203, the DSP 203 executes activation processing of the DSP 203 using the boot program of the DSP 203 stored in the ROM 204.

In step S104, upon completion of activation processing of the CPU 201, the CPU 201 downloads the control program of the CPU 201 and the data processing program of the DSP 203 from the ROM 103 to the RAM 102.

In step S204, upon completion of the activation processing of the DSP 203, the DSP 203 shifts to the interrupt waiting state. Then, in step S205, when the DSP 203 has shifted to the interrupt waiting state, the DSP 203 stops the supply of the clock to the DSP 203 using the clock control unit 310.

In step S105, upon completion of downloading the program of the DS P203, the CPU 201 transmits an interrupt signal to the DSP 203. Then, in step S206, the DSP 203 receives the interrupt signal from the CPU 201 using the interrupt processing unit 309.

In step S106, after sending the interrupt signal to the DSP 203, the CPU 201 stands by until the DSP 203 completes data processing.

In step S207, when the interrupt signal is received from the CPU 201, the DSP 203 resumes the supply of the clock to the DSP 203 using the clock control unit 310.

Next, in step S208, upon reception of the interrupt signal sent from the CPU 201, the DSP 203 executes exceptional processing as described below (various types of processing used for returning the DSP 203 from the interrupt state). First, the DSP 203 analyzes an interrupt cause. Next, if the interrupt cause is data processing using the main domain 301, the DSP 203 clears the interrupt cause, and executes an interrupt return command for returning from the interrupt state. According to the interrupt return command, the DSP 203 accesses the data processing program of the DSP 203 stored in the RAM 102 based on an address indicating a storage region in which the data processing program of the DSP 203 is stored in the ROM 204.

Next, in step S209, the DSP 203 returns from the interrupt waiting state.

In step S210, the DSP 203 executes processing of data, using the data processing program of the DSP 203 stored in the RAM 102.

FIG. 4 is a time chart illustrating operating statuses of the CPU 201 and the DSP 203 when the sequence in FIG. 3 is executed.

In time t2 to t5, it can be seen that electric power consumed by the DSP can be reduced by applying the clock gating to the DSP.

According to the present exemplary embodiment, electric power consumption of the DSP 203 can be reduced by applying the clock gating to the DSP 203 while activation of the DSP 203 has been completed during activation of the CPU 201.

In the first exemplary embodiment, the ROM 204 stores the address on the RAM 102 in which the data processing program of the DSP 203 is stored. When the interrupt return command in the exceptional processing is executed in step S206, the DSP 203 accesses the data processing program of DSP 203 stored in the RAM 102 based on the address stored in the ROM 204.

However, the address on the RAM 102 in which the program is stored is determined when the program is compiled. Accordingly, compiling of the data processing program of the DSP 203 is to be completed when the system LSI 101 is created. If so, the data processing program of the DSP 203 will not be able to be changed, if a user wants to change it at a later time.

In a second exemplary embodiment, to solve the above described situation, a configuration of the first exemplary embodiment is changed as follows.

First, an address of a predetermined register (not shown) is stored in the ROM 204. Next, before executing the interrupt return command of the exceptional processing in step S206, the address on the RAM 102 in which the data processing program of the DSP 203 is stored is stored in the above described predetermined register (not shown). The processing may be executed when the CPU 201 downloads the data processing program of the DSP 203 into the RAM 102.

Then, the DSP 203 accesses the predetermined register based on the address stored in the ROM 204, when executing the interrupt return command of the exceptional processing in step S206. The DSP 203 accesses the data processing program of the DSP 203 stored in the RAM 102 based on the address stored in the predetermined register.

According to the present exemplary embodiment, it becomes possible to create the system LSI 101 in a state where compiling of the data processing program of the DSP 203 is not completed. Consequently, it becomes possible to change the data processing program of the DSP 203 at a later time.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155315 filed Jun. 30, 2009, which is hereby incorporated by reference herein in its entirety.

What is claimed is:

1. An apparatus comprising:
a first processing unit configured to control the apparatus;
a second processing unit configured to execute data processing according to a command issued from the first processing unit;
a supply unit configured to supply a clock to the first processing unit and to supply a clock to the second processing unit; and
a control unit configured to stop, after a boot of the second processing unit has been completed and before a boot of the first processing unit is completed, a supply of the clock to the second processing unit, and to resume, after the boot of the first processing unit has been completed, the supply of the clock to the second processing unit.

2. The apparatus according to claim 1, wherein the first processing unit is a central processing unit, and
wherein the second processing unit is a digital signal processor.

3. The apparatus according to claim 1, further comprising:
a first storage unit configured to store a first boot program to be used to boot the first processing unit; and
a second storage unit configured to store a second boot program to be used to boot the second processing unit is activated.

4. The apparatus according to claim 3, wherein the first and second storage units are non-volatile storage units.

5. The apparatus according to claim 3, further comprising a third storage unit configured to store a third program to be used to execute data processing.

6. The apparatus according to claim 5, wherein the third storage unit is a volatile storage unit.

7. The apparatus according to claim 5, wherein the first processing unit controls the third storage unit to store the third program in response to the completion of boot of the first processing unit.

8. The apparatus according to claim 5, wherein the second processing unit executes the data processing using the third program in response to resumption of the supply of the clock to the second processing unit.

9. The apparatus according to claim 5, wherein the second storage unit stores first information used for accessing the third program, and
wherein the second processing unit accesses the third program based on the first information.

10. The apparatus according to claim 9, wherein the first information is a first address indicating a storage region in which the third program is stored in the third storage unit.

11. The apparatus according to claim 9, further comprising a fourth storage unit configured to store the first address indicating a storage region in which the third program is stored in the third storage unit,
wherein the first information is a second address indicating a storage region in which the first address is stored in the fourth storage unit.

12. The apparatus according to claim 1, wherein the control unit includes a clock gate circuit for stopping a supply of a clock to the second processing unit from the supply unit.

13. The apparatus according to claim 1, wherein the second processing unit becomes a state that an interrupt issued from the first processing unit is receivable, after the boot of the second processing unit is completed.

14. The apparatus according to claim 13, wherein, in the state, a clock supplied from the supply unit is input to the control unit, and a clock supplied from the supply unit is not input to the second processing unit.

15. The apparatus according to claim 1, wherein, in a case where the apparatus is turned on or is returned from a power saving mode to a normal mode, the boot of the first processing unit and the boot of the second processing unit are executed.

16. The apparatus according to claim 15, wherein the first processing unit and the second processing unit are reset before the boot of the first processing unit and the boot of the second processing unit are executed.

17. The apparatus according to claim 16, wherein in a case where the apparatus is turned on or is returned from a power saving mode to a normal mode, the supply unit supplies a clock to the first processing unit and a clock to the second processing unit, and the first processing unit and the second processing unit are reset.

18. The apparatus according to claim 1, further comprising at least one of a printer configured to print an image on a sheet and a scanner configured to read a document.

19. The apparatus according to claim 1, further comprising a receiving unit configured to receive image data, wherein the second processing unit executes image processing on image data received by the receiving unit.

20. A method for controlling an apparatus including:
a first processing unit configured to control the apparatus;
a second processing unit configured to execute data processing according to a command issued from the first processing unit;
a supply unit configured to supply a clock to the first processing unit and to supply a clock to the second processing units, and a control unit configured to stop a supply of the clock to the second processing unit, the method comprising:
stopping the supply of the clock to the second processing unit after a boot of the second processing unit has been completed and before a boot of the first processing unit is completed; and resuming the supply of the clock to the second processing unit after the boot of the first processing unit has been completed.

21. A non-transitory computer-readable storage medium that stores a program for causing an apparatus including:

a first processing unit configured to control the apparatus;

a second processing unit configured to execute data processing according to a command issued from the first processing unit;

a supply unit configured to supply a clock to the first processing unit and to supply a clock to the second processing unit, and a control unit configured to stop a supply of the clock to the second processing unit, to execute:

stopping the supply of the clock to the second processing unit after a boot of the second processing unit has been completed and before a boot of the first processing unit is completed; and resuming the supply unit to resume the supply of the clock to the second processing unit after the boot of the first processing unit has been completed.

\* \* \* \* \*